United States Patent
Kouznetsov et al.

(10) Patent No.: US 6,782,527 B1
(45) Date of Patent: Aug. 24, 2004

(54) SYSTEM AND METHOD FOR EFFICIENT DISTRIBUTION OF APPLICATION SERVICES TO A PLURALITY OF COMPUTING APPLIANCES ORGANIZED AS SUBNETS

(75) Inventors: Victor Kouznetsov, Aloha, OR (US); Dan Melchione, Beaverton, OR (US); Martin Fallenstedt, Beaverton, OR (US)

(73) Assignee: Networks Associates, Inc., Santa Clara, CA (US)

( * ) Notice: Subject to any disclaimer, the term of this patent is extended or adjusted under 35 U.S.C. 154(b) by 875 days.

(21) Appl. No.: 09/650,983

(22) Filed: Aug. 30, 2000

Related U.S. Application Data

(60) Provisional application No. 60/178,826, filed on Jan. 28, 2000.

(51) Int. Cl.[7] .............................. G06F 9/44; G06F 15/16
(52) U.S. Cl. ........................ 717/103; 709/201; 709/202
(58) Field of Search ................................ 717/101, 103, 717/120, 122, 168, 170, 171, 172, 173, 174, 175, 176, 177, 178; 709/223, 224

(56) References Cited

U.S. PATENT DOCUMENTS

| | | | |
|---|---|---|---|
| 5,119,489 A | * 6/1992 | Bond et al. ................... 714/46 |
| 5,687,320 A | * 11/1997 | Wiley et al. ................. 709/245 |
| 5,696,760 A | * 12/1997 | Hardin et al. ............... 370/252 |
| 5,706,431 A | * 1/1998 | Otto ........................... 709/221 |
| 5,768,539 A | * 6/1998 | Metz et al. .................. 709/249 |
| 5,860,012 A | 1/1999 | Luu ............................ 395/712 |
| 5,870,611 A | 2/1999 | London Shrader et al. . 395/712 |
| 5,959,989 A | 9/1999 | Gleeson et al. ............. 370/390 |
| 5,966,540 A | 10/1999 | Lister et al. ................. 395/712 |
| 5,991,856 A | 11/1999 | Spilo et al. .................. 711/147 |
| 6,006,035 A | 12/1999 | Nabahi ....................... 395/712 |
| 6,009,274 A | * 12/1999 | Fletcher et al. ............. 717/173 |
| 6,029,175 A | * 2/2000 | Chow et al. ............. 707/104.1 |
| 6,108,782 A | * 8/2000 | Fletcher et al. ............. 713/153 |
| 6,199,204 B1 | * 3/2001 | Donohue ..................... 717/178 |

* cited by examiner

Primary Examiner—Jack B. Harvey
Assistant Examiner—Beatriz Prieto
(74) Attorney, Agent, or Firm—Christopher J. Hamaty; Swidler Berlin Shereff Friedman, LLP

(57) ABSTRACT

A method of providing a set of desired application functions to a plurality of network-coupled computing appliances. A set of code resident on a network-connected application management server is identified that when executed in a network appliance provide the desired application functions. A first application management agent in a first of the network-coupled computing appliances and a second application management agent in a second of the network-coupled computing appliances are executed. The first application management agent repetitively checks for updates of the identified code. Updates of the identified code are downloaded from the application management server into the first network-coupled computing appliance as the updates become available. Updates of the identified code are downloaded from the first network-coupled computing device into the second network-coupled computing appliance.

20 Claims, 5 Drawing Sheets

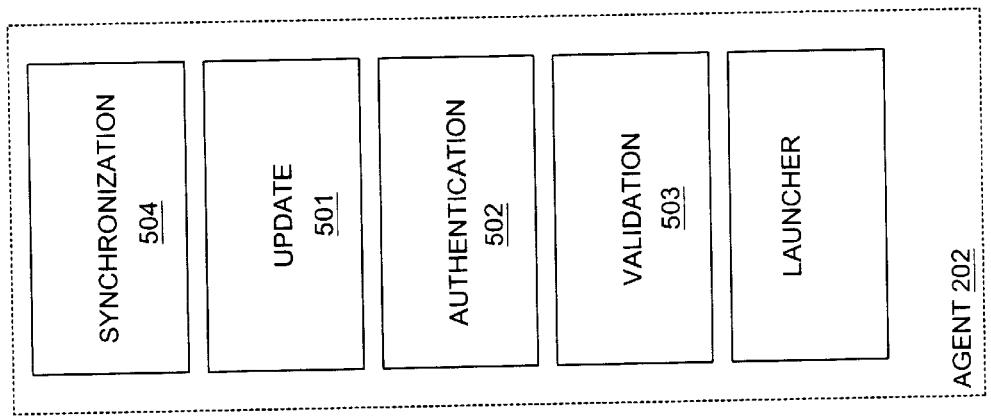

SYSTEM AND METHOD FOR EFFICIENT DISTRIBUTION OF APPLICATION SERVICES TO A PLURALITY OF COMPUTING APPLIANCES ORGANIZED AS SUBNETS

RELATED APPLICATIONS

The present invention claims priority to copending U.S. Provisional Patent application Serial No. 60/178,826 entitled "METHOD AND SYSTEM FOR REMOTELY PROVIDING NETWORK SECURITY AND AVAILABILITY SERVICES" filed Jan. 28, 2000, the specification of which is incorporated herein by reference.

The present application is also related to U.S. patent applications, all of which are filed concurrently herewith and are incorporated by reference herein:

U.S. Ser. No. 09/651,466 entitled SYSTEM AND METHOD FOR PROVIDING DYNAMIC APPLICATION SERVICES identified as docket number NAI 00.059.01;

U.S. Ser. No. 09/651,465 entitled SYSTEM AND METHOD FOR PROVIDING APPLICATION SERVICES WITH CONTROLLED ACCESS INTO PRIVILEGED PROCESSES identified as docket number NAI 00.061.01;

U.S. Ser. No. 09/651,467 entitled SYSTEM AND METHOD FOR SECURELY PROVIDING APPLICATION SERVICES identified as docket number NAI 00.062.01

U.S. Ser. No. 09/650,559 entitled SYSTEM AND METHOD FOR PERSISTENT, EFFICIENT DISTRIBUTION OF APPLICATION SERVICES identified as docket number NAI 00.004.01; and U.S. Ser. No. 09/650,558 entitled METHOD FOR CLOSING SALES OVER AN OPEN NETWORK USING AN AUTOMATED HAGGLING SYSTEM identified as docket number NAI 99.116.02.

BACKGROUND OF THE INVENTION

1. Field of the Invention

The present invention relates, in general, to software application management, and, more particularly, to software, systems and methods for efficiently deploying software application services by providing application retrieval agents within a defined portion of a network topology.

2. Relevant Background

Application software generally refers to a collection of software mechanisms that implement a desired program behavior to manipulate data provided by a user and/or obtained from both internal and external data stores. A software application typically is implemented on top of an operating system (OS) that provides essential functionality for interfacing with computer system hardware and program interaction. A software application typically implements a user interface using devices such as keyboards, mice, microphones, monitors, and the like to communicate data with a user. Examples include word processors, anti-virus programs, spreadsheets, world-wide-web browsers, and the like.

Application software continues to become more complex and interrelated. As computer hardware becomes more powerful, less expensive, and more ubiquitous in electronic devices, application software that operates on this hardware becomes both more complex and more varied. Unlike hardware, however, software mechanisms tend to evolve rapidly to adapt to new environments and provide additional functionality. This leads to a situation in which installed software applications require, or at least benefit from, continued monitoring and maintenance by skilled software professionals familiar with the construction and mechanisms that make up the software. Although the problem is more pronounced in complex software applications such as security software, antivirus software, and the like, it remains a significant problem even for comparatively simple applications that must augment or modify behavior to remain competitive.

Coincidentally, software reliability is becoming more important. As people rely on software performance for more business and personal activities, the cost of software downtime and poor performance have become more significant. These costs are realized both in terms of money and lost time.

Historically, software applications have been distributed and maintained as if they were hard goods like the computers they operate on. However, unlike hardware, software's greatest strength is in its ability to be readily modified and updated to meet the needs of new environments while the hardware remains unchanged. Traditional distribution involves embodying the application code onto a tangible media, packaging the media and physically distributing the media from a manufacturer to a client's computer. The software is then installed on the client computer by storing copies of files on a hard disk and hooking the software application into the operating system during an installation procedure. Only after this complex distribution process occurs can the user launch the application code and use the behaviors and services implemented therein.

In this model of applications as goods, the installed software is intended to be fixed as if it were hardware. The application developer, if successful, continues to implement improvements that will be released to a user in subsequent patches, updates or versions. However, the user continues to use the originally released product until the new release becomes available at which time the entire distribution/installation process is repeated. This cycle hampers the effectiveness of software applications as it is impracticable to deploy incremental improvements except in extraordinary circumstances (e.g., the originally released product is materially defective). Also, the installation processes are notoriously difficult on many computer platforms and often require knowledge of software interactions, drivers, and hardware that are neither documented nor known to the installer.

Application providers have made many efforts to simplify the process of software application management. For example, many applications provide downloadable access to updates and patches. This eases distribution of updates and patches, but essentially places the burden of maintaining an application on the user. The user must determine when an update is required and then find, download, install, configure, and maintain the updated code. Curiously, it is the application provider that is often best positioned to perform some or all of these tasks.

Moreover, even simple patches and updates often involve transport and installation of large files, often in the multi-Megabyte size range. It is contemplated that file updates and patches will increase in size in the future. This makes downloadable access impractical for users with limited bandwidth connection to a download source. In particular, in a network where many users share Internet access, when an application update becomes available each user has a simultaneous need to download the product. In even small networks, the simultaneous download of large files may consume the available network bandwidth for many minutes or even for hours. If multiple software applications are continuously downloaded to remain current, a typical shared Internet connection may become entirely consumed by the download activity and unavailable for other productive work.

Currently the large download traffic also affects application software providers. Once an update is posted for distribution, the application provider hopes that requests for the updated code will arrive over a period of time. A large number of simultaneous requests cannot be served and may crash the network source computers. Hence, both consumers and providers of application software desire a more manageable system and method for deploying application code and updates to application code.

Many networks include caching machines coupled to store copies of data downloaded by any network node for future use by any other network node. Network caches provide a partial solution in that load on the application code supplier is reduced. However, proxy caches still require at least one node to originate a download.

Hence, a need exists for software, systems and methods to enhance software application deployment in a manner that lessens the burdens of application management with respect to the application users while providing superior management and control over the processes involved in providing application services. Moreover, there exists a need for an application deployment system and methodology that provides application services ubiquitously and continuously without forcing the application user to take action to make it work.

SUMMARY OF THE INVENTION

Briefly stated, the present invention involves a method of providing a set of desired application functions to a plurality of network-coupled computing appliances. A set of code resident on a network-connected application management server is identified that when executed in a network appliance provides the desired application functions. A first application management agent in a first of the network-coupled computing appliances and a second application management agent in a second of the network-coupled computing appliances are executed. The first application management agent repetitively checks for updates of the identified code. Updates of the identified code are downloaded from the application management server into the first network-coupled computing appliance as the updates become available. Updates of the identified code are downloaded from the first network-coupled computing device into the second network-coupled computing appliance.

BRIEF DESCRIPTION OF THE DRAWINGS

FIG. 5 shows components of an application management agent implemented in accordance with the present invention.

DETAILED DESCRIPTION OF THE PREFERRED EMBODIMENTS

Like the applications service provider model described hereinbefore, the present invention recognizes that software applications are more usefully described as services that implement behavior and manipulate data on behalf of clients. However, the present invention is not burdened by the illusion that application code must be executed on a centralized computer to obtain the benefits of the application service provider model. In accordance with the present invention, application code is efficiently distributed amongst and executed by a variety of client machines, but is maintained in a consistent state with a model of the application that is resident on a centralized network-connected server. In this manner, application management is performed almost entirely on the model of the application.

The management tasks that are performed from the client (hereinafter referred to as clients, client machines, and client computers) are sufficiently simplified that that can be implemented by a small agent program executing on the client platform with minimal or no assistance from the application user. In this sense, the application, management tasks become invisible to the application user such that the software application is purely implemented by providing the application functionality to the user who can be unaware of the mechanisms and management tasks associated with the application.

Mechanisms are implemented to maintain coherence between the application code executing on the client with the application model stored on the server. In this manner, the application software can be maintained, modified and updated as easily as conventional application service provider models. The present invention requires an additional step of in forming the client machines about changes in the model. This step can be accomplished by server-side notification schemes, client side discovery schemes, or hybrids of these methods. In this manner, the clients obtain copies of the model changes and implement the changes within the code executing on the client.

Because application code is in fact executing on the client machine, the application code has all of the advantages of conventionally distributed and installed application code. The application code can be closely coupled with the operating system and hardware, if desired. The application code can access and use shared resources such as dynamic link libraries, drivers, system resources and the like. This logical proximity to the client computer enables applications implemented in accordance with the present invention suitable for complex behaviors such as those required by anti-virus software, security software, system performance monitoring software, and the like.

Figure 2:
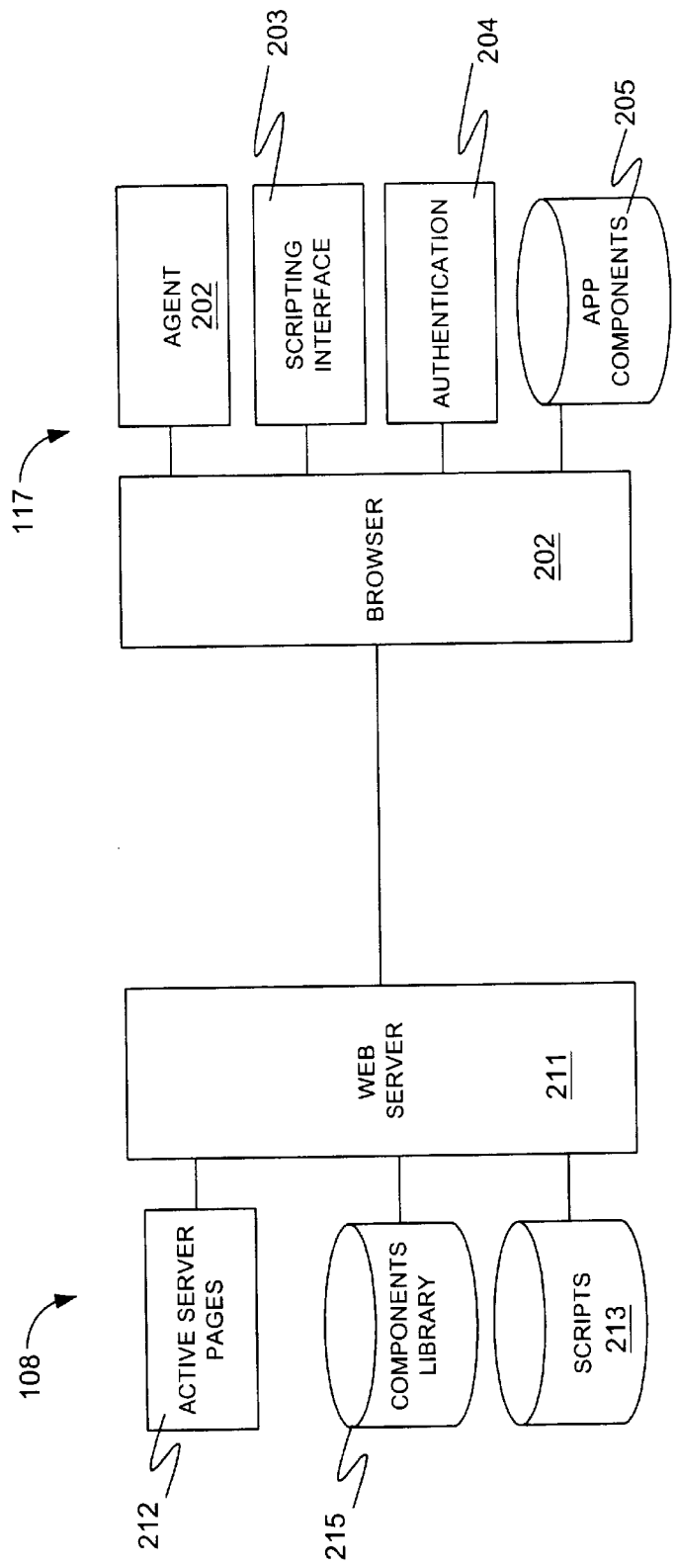
FIG. 2 illustrates basic components of a distributed computing system for implementing application services in accordance with the present invention.

The present invention is illustrated and described in terms of a distributed computing environment such as an enterprise computing system using public communication channels such as the Internet 101 and public switched telephone network (PSTN) 102 shown in FIG. 2. However, an important feature of the present invention is that it is readily scaled upwardly and downwardly to meet the needs of a particular application. Accordingly, unless specified to the contrary the present invention is applicable to significantly larger, more complex network environments as well as small network environments such as conventional LAN systems.

Figure 1:
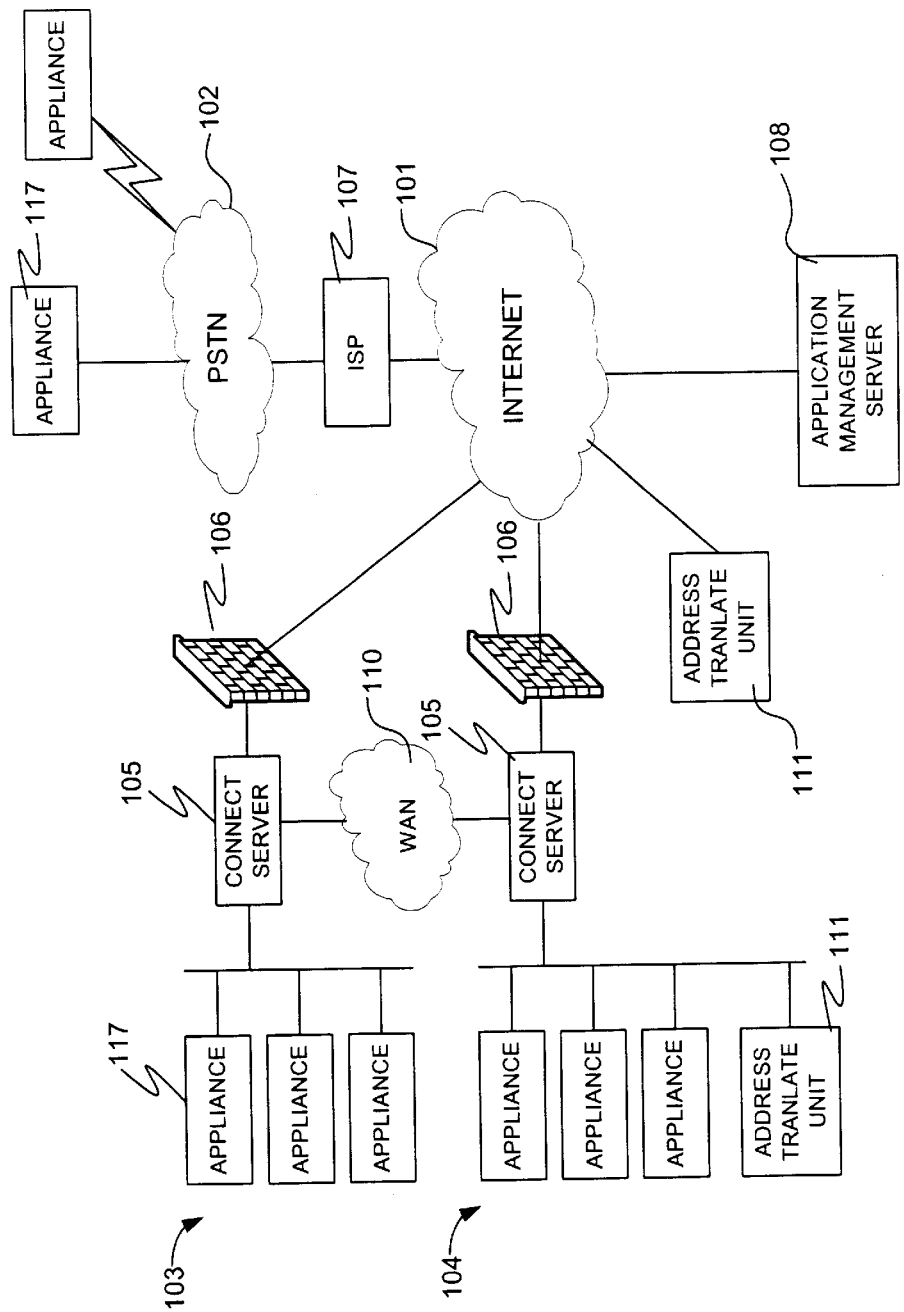
FIG. 1 shows a networked computer environment in which the present invention is implemented.

FIG. 1 shows an exemplary computing environment 100 in which the present invention may be implemented including a variety of internetworking components such as Internet 101, public switched telephone network (PSTN) 102, and a wide area network (WAN) 110. The distinct internetwork designations shown in FIG. 1 provide a conceptual model and are provided for ease of description and understanding. In practice, Internet 101 may include components of both PSTN 102 and WAN 110. Likewise, WAN 110 is often implemented using PSTN 102 and/or Internet 101.

Essentially, a number of computing devices and groups of devices are interconnected through a network 101. The particular embodiments described herein use the public national information infrastructure (i.e., the Internet) to implement network 101. Alternatively, network element 101 may be implemented as a private network using WAN technology, intranet technology, fibre channel, and the like.

A first network segment 103 and a second network segment 104 are interconnected using Internet 101 and/or WAN 110 in a typical fashion. Network segments 103 and 104 are usefully thought of as local area networks (LANs) although either or both may represent only a portion of a LAN in a given network's topology. The present invention is readily adapted for both client/server and peer-to-peer type networks as well as hybrid topologies. Network segments 103 and 104 comprise copper, optical, wireless and/or other available physical connection technologies.

LANs 103 and 104 implement physical and logical communications links between a number of network appliances 117. Local networks 103 and 104 are coupled to network 101 through connect servers 105 and/or firewalls 106. Connect servers 105 are implemented by connection sharing software such as Microsoft Internet connection sharing service (ICS) or by software such as found in routers. Firewalls 106 may also be implemented by a router or by other firewall software operating on a special purpose computer. LANs 103 and 104 may be implemented using any available topology and may implement one or more server technologies including, for example a UNIX, Novell, or Windows NT, or peer-to-peer type network. Each network will include distributed storage implemented in each device and typically includes some mass storage device (not shown) coupled to or managed by a server computer.

Appliances 117 provide application services to users. Network appliances 117 include, for example, computers, printers, file servers, mass storage and the like. Appliances include computing devices varying in complexity from workstations and personal computers to hand-held computers and personal digital assistants to office equipment including telephones, copiers, fax machines and the like. One or more of appliances 117 may be configured as an application and/or file server. Each local network 103 and 104 may include a number of shared devices (not shown) such as printers, file servers, mass storage and the like. Similarly, appliances 117 may be shared through network 101 to provide application and file services, directory services, printing, storage, and the like.

In addition to shared LAN connections to network 101, appliances 117 may also connect to network 101 using the public switched telephone network 102 by way of dial-up connections. Dial-up connections are supported by a variety of Internet service providers (ISPs) 107. Dial up connections may be support by land line connections or through wireless interfaces to PSTN 102 such as available in digital and analog cellular systems. ISP 107 supports a connection to network 101.

In accordance with the present invention, one or more application management servers 108 are coupled to network 101. For ease of description a single application management server 108 is shown, but in practice it is beneficial to provide tens, hundreds, or even thousands of application management servers 108 geographically distributed throughout the an application environment. Each application management server 108 has a unique address with respect to network 101 and so is reachable by network-connected appliances 117. The present invention leverages the existing Internet infrastructure to provide frequent, ubiquitous communication between appliances 117 and application management servers 108.

Each of the appliances and servers shown in FIG. 1 may include memory, mass storage, and a degree of data processing capability sufficient to manage their connection to network 101. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared mass storage (not shown) that provide mass storage capacity beyond what an individual device can efficiently use and manage. Selected components of the present invention may be stored in or implemented in shared mass storage.

In an optional embodiment of the present invention, one or more address translation devices 111 are provided. For example, an address translation device 111 may be coupled to LAN 104 and shared amongst devices behind firewalls 106. Alternatively address translation device is coupled to network 101 and is accessible by any number of network-connected devices. Address translation devices 111 provide a dynamic mapping between network invalid addresses and network valid addresses for a network-coupled resource. This allows a network-coupled resource to be located without providing explicit knowledge of the resource to every appliance 117. This also allows the roles of network resources to be dynamically changed by altering the address mappings.

FIG. 2 illustrates functional components of an appliance 117 and an application management server 108 in accordance with an embodiment of the present invention. A software-implemented agent 202 executes on the computing devices within the appliance 117. Agent 202 performs a relatively small number of functions in the application management solution in accordance with the present invention. First, agent 202 establishes a frequent connection with application management server 108 to check for updates in code and/or data used to provide the application services. When appropriate, agent 202 downloads updated code into memory and/or storage devices within appliance 117.

In the embodiment shown in FIG. 2, a World Wide Web browser 201, also referred to as browser 201, is used to implement network connectivity and to provide a mechanism through which software application functionality can be delivered. In a particular example, browser 201 is implemented using Microsoft Internet Explorer software which includes, among other things, a browser and network protocol stacks to implement hypertext transfer protocol (HTTP), transfer connection protocol (TCP) and Internet protocol (IP) to enable browser 201 to communicate with a web server 211 over Internet 101. Although the specific example uses a browser and HTTP user-level protocols for network connectivity, it should be understood that any available protocols and connectivity mechanisms may be used in practical implementations. Agent 202 may interact directly with network protocols provided by an operating system or operating system services within appliance 117, for example.

Preferably, agent 202 provides security functions as well as to authenticate the identity of applications management server 108 to prevent unwanted download from impostor server 109 (shown in FIG. 1), for example. Security functions may also include functions to authenticate that any code downloaded from AMS 108 is authentic code intended for download to appliance 117. Security functions may be incorporated within agent 202 or accessed via a separate authentication module 204. Many off-the-shelf Internet access packages include not only a web browser component 201, but also an authentication module 204 that includes methods for performing authentication and validation functions.

Appliance 117 also includes a set of application components 205. Application components 205 comprise program code that implements some application function or set of functions. Application components 205 range in complexity from relatively simple functions that retrieve data from a database to complex programs that implement sophisticated behavior such as scanning the entire appliance 117 for viruses. In the particular example application components 205 are provided as compiled code stored in mass storage/memory of appliance 117. Each component has an interface (e.g., application programmer's interface (API)) that enables the functionality of a given component 205 to be invoked. The interface(s) typically allow another component or process executing on the processor(s) of appliance 117 to pass data, commands and variables to the component 205 and receive data and commands back from the component 205.

In operation, agent 202 uses the network connectivity features of browser 201 to connect to web server 211. Web server 211 comprises a commercial web server software package such as Microsoft Internet Information Server (IIS), for example. Web sever 211 is used to communicate with HTTP clients such as browser 201. In applications in which appliance 117 uses other network protocols web server 211 is conveniently replaced by complementary server software. Some advantages of using web server 211 to implement the server-side network interface is that web servers are widely available from a number of manufacturers and are readily extended to implement new functionality.

In the example of FIG. 2, web server 211 uses active server pages (ASP) component 212. Active server pages are provided with IIS, but equivalent components that function to compile script or other interpreted language program files within a server machine are available for other server platforms. ASP 212 is used to compile scripts 213 in response to requests from appliance 117. The compiled scripts can be executed on web server 211 or forwarded to appliance 117 for execution.

In accordance with the present invention, software applications services are provided by cooperative action of scripts 213 and application components 205. A separate and usually much larger set (i.e., a super set) of application components are maintained on the server side in a components library 215. Depending on its size, components library 215 may be implemented in a storage device within application management server 108 or in external storage accessible to application management server 108. It is contemplated that application management server 108 will serve a wide variety of diverse applications and so the library 215 will contain a large number of application components compared to the selected set of application components 205 stored within an appliance 117. The set of components 205 within any particular appliance 117 is selected by agent 202 to meet the needs of appliance 117 and provide the application services desired by its user.

In accordance with the present invention, an instance of a software application is constructed using a selected set of application components 205 that are cooperatively initiated and executed on appliance 117 according to application logic implemented in a script 213. The bulk of program code is typically in application components 205 while scripts 213 are relatively light-weight. It is expected that application components 205 will change relatively slowly although this is not a requirement. In contrast, a script 213 can be changed frequently.

Appliance 117 preferably includes a scripting interface 203 for executing script, including scripts 213, provided by server 211. Example scripting interfaces 203 include VBScript, JScript, JavaScript. Markup language documents such as extensible markup language (XML) is an alternative tool enabling client-side program execution. Collectively, these are tools that enable execution of code on a client machine (e.g., appliance 117) that is generated by server 211.

At runtime, agent 202 determines whether the script 213 and/or any components 205 must be downloaded. This can be done by determining whether any components 205 have changed since the last instance of the software application managed by agent 202. In a first alternative, each agent 202 queries a statically defined network resource (e.g., another agent 202) to determine if an update has occurred.

In a second alternative, each agent 202 generates a broadcast to a selected subset of network resources (e.g. neighboring computers) to request particular information (e.g., to determine if an update has occurred). The subset(s) of network resources is selected to reduce network traffic. Optionally, if nobody in the selected subset responds to this request, agent 202 makes a second broadcast to query whether any of the neighboring computers are currently downloading the requested information. If a response is returned based on the second request, the responding computer is periodically queried for progress information. The returned progress information may be used to update an installation/update progress indicator in a user interface, for example. From the perspective of a user of the agent 202 it appears that the agent 202 is downloading something when in reality it is a different computer that is currently downloading the requested information.

In a particular example, the selected subset comprises a group of appliances 203 that share a network connection to the application management server 108 (e.g., a subnet). For example, the appliances 117 in LANS 103 and 104 each form such a subnet. Each agent 202 that receives the broadcast request determines whether the requested update has been received by that agent. If the requested update has been received, the agent generates a response to the requesting agent 202 with the requested update. Alternatively, the responding agent can supply a reference to another agent 202 that is known to possess the requested update. To avoid multiple agents responding at the same time, each agent optionally delays its response for a preset or random amount of time ranging from, for example, zero to two seconds. This delay allows the responses from multiple agents to be dispersed through time. Once a requesting agent 202 has received the update, it too can participate in responding to subsequent distribution requests. In this manner, an update is propagated quickly through a subnet.

Updates may also be obtained across subnet boundaries through, for example, WAN 110. In such an implementation, an agent 202 that has already downloaded the updated code is placed in a role of a "relay server". The relay server agent 202 notifies a resource that is common to both subnets such as a server or database that it is now acting as a relay server. Subsequent requests for the update from outside the relay server's subnet can locate the relay server by querying the common resource.

In another alternative, each agent 202 requests update status from a statically defined network invalid address. A network coupled address translator 111 (shown in FIG. 1) receives the network invalid address and resolves it to a network valid address of either a specific appliance 117 or application management server 108 from which the update can be obtained. This operation is akin to a domain name service provided in the publicly available Internet.

In this alternative, it is useful to dynamically update mapping tables within the address translator 111 so that the network-invalid addresses can be dynamically mapped to a variety of sources for the desired update code. It is possible to use application management server 108, for example to update the address mapping devices 111 in response to downloading updated code to particular agents 202. The first agent 202 within a subnet to request a download is designated as an intermediary application distribution resource. This designation can be reflected by an appropriate mapping in address translators 111. When a subsequent agent 202 requests access to an application distribution resource it is given the newly mapped address. The next time the same agent 202 requests an application distribution resource, it may be given another network valid address corresponding to another network device.

It is contemplated that an agent 202 will be configured to continuously monitor whether updates are available from a static location such as application management server 108, but then download the application code itself from a secondary resource (e.g., another appliance 117). This functionality is provided either by causing the application management server 108 to return an identifier pointing to the secondary resource, or using a network address translation described above.

Many browsers 201 include mechanisms for determining whether a web page has changed, and these mechanisms are readily leveraged by the present invention to determine if any program components or scripts have changed. It is contemplated that agent 202 can access server 211 periodically, sporadically, or on demand, for example, to determine if a new script or components require download. Alternatively, any downloaded components 205 or scripts 213 may be associated with expiration conditions. Once the expiration conditions are satisfied, agent 202 will download replacements.

It is contemplated that a number of agents will request updates in a relatively short time period ranging from one day to a few minutes. As described hereinbefore, the agents are preferably configured to obtain the updates in multiple stages. In the first stage, agents 202 will generate a broadcast request for the update within a specified subnet. In an intermediate stage, the agent 202 will request the update using a broadcast message within a specified group of subnets, for example a group of networks linked by a WAN. In a final stage, agent 202 will request the update using a request directly to an application management server 108.

The logic required for selecting a particular source for the update may be implemented with several variations. In general, it is desirable that the source selection logic be implemented by the agent 202 itself, the application management server 108, or by a combination of the two entities so that neither the user or a network technician be required to manage the source selection process. It is possible that updates will be split amongst two or more sources. For example, when a subnet agent has downloaded a portion but less than all of the update code, a requesting agent may obtain the downloaded portion from the subnet agent and obtain the remainder from the application management server. Alternatively, the subnet agent may respond to the requesting agent an indication of when its own download will be completed such that the requesting agent can wait or go to sleep until the subnet agent has the desired code ready for download.

It should be appreciated that the present invention discloses a system and method for deployment of applications services via dynamic distribution of software as opposed to conventional methods that focus on deploying application software and leave it to the end user to configure and cause the software to provide the desired services. By this it is meant that the present invention operates to ensure that every time an application is run, it is automatically updated with minimal or no user intervention so that it provides the desired services on demand. The user is only made aware of the services being provided, if desirable, not the exchange of code, configuration files, data files, and the like that occur in order to provide the application services. This can be a subtle difference to understand, but once realized it is apparent that the present invention teaches a fundamentally different way of deploying mechanisms to provide application services.

The present invention is particularly useful for a wide variety of application services that do not require or benefit from user interaction. For example, anti-virus software such as VirusScan ASaP (TM), WebShield ASaP (TM) and the like operate to detect and stop virus code automatically before it is executed. Another example is security assessment software that probes computer systems and networks to identify strengths and weaknesses. These types of application services often run as a background processes that benefit little from user interaction. Because the present invention provides for continual update, configuration and execution, such services can be provided without imposing on the user to learn, understand, and manage yet another application.

Figure 3:
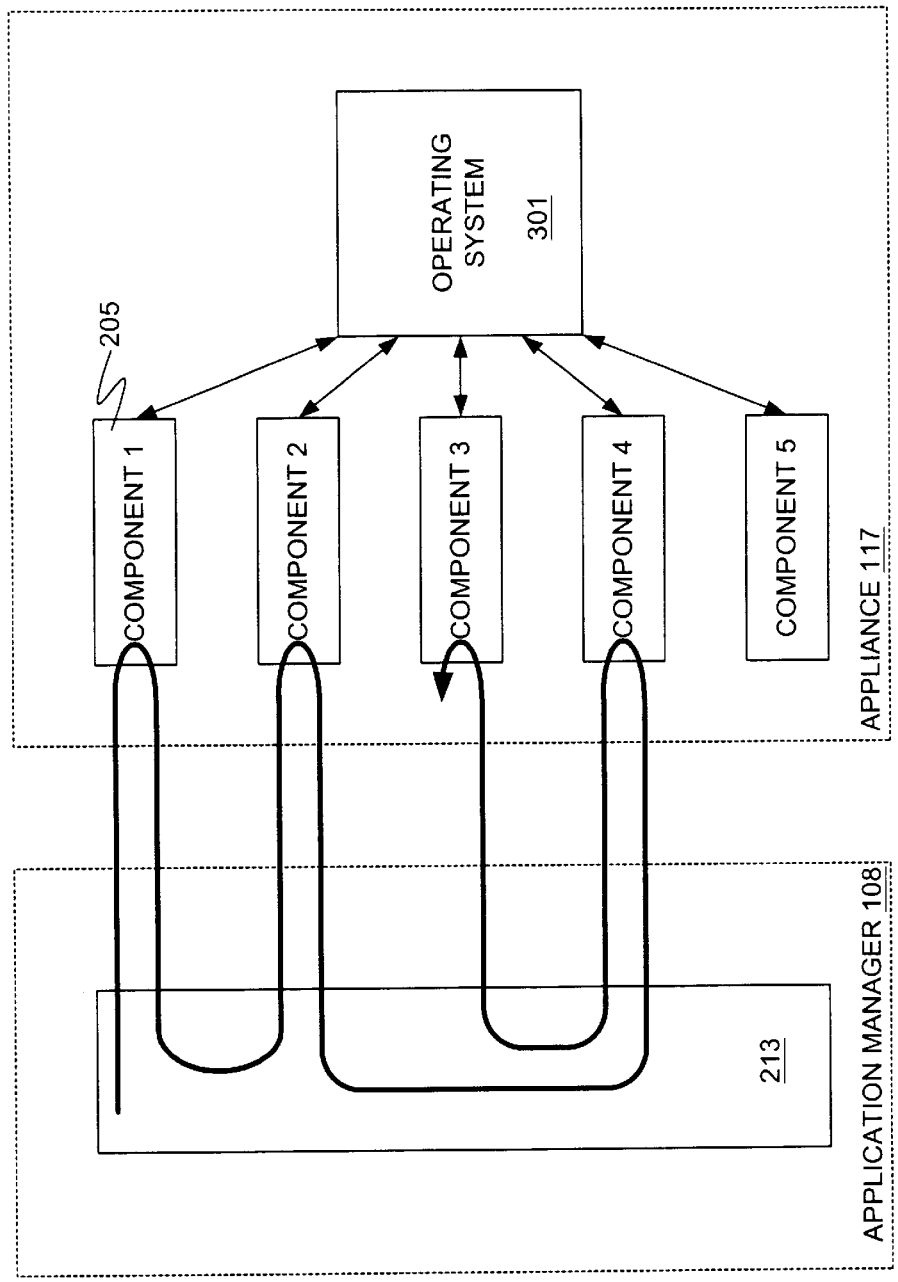
FIG. 3 illustrates a process flow during an application instance in accordance with a first embodiment of the present invention.
Figure 4:
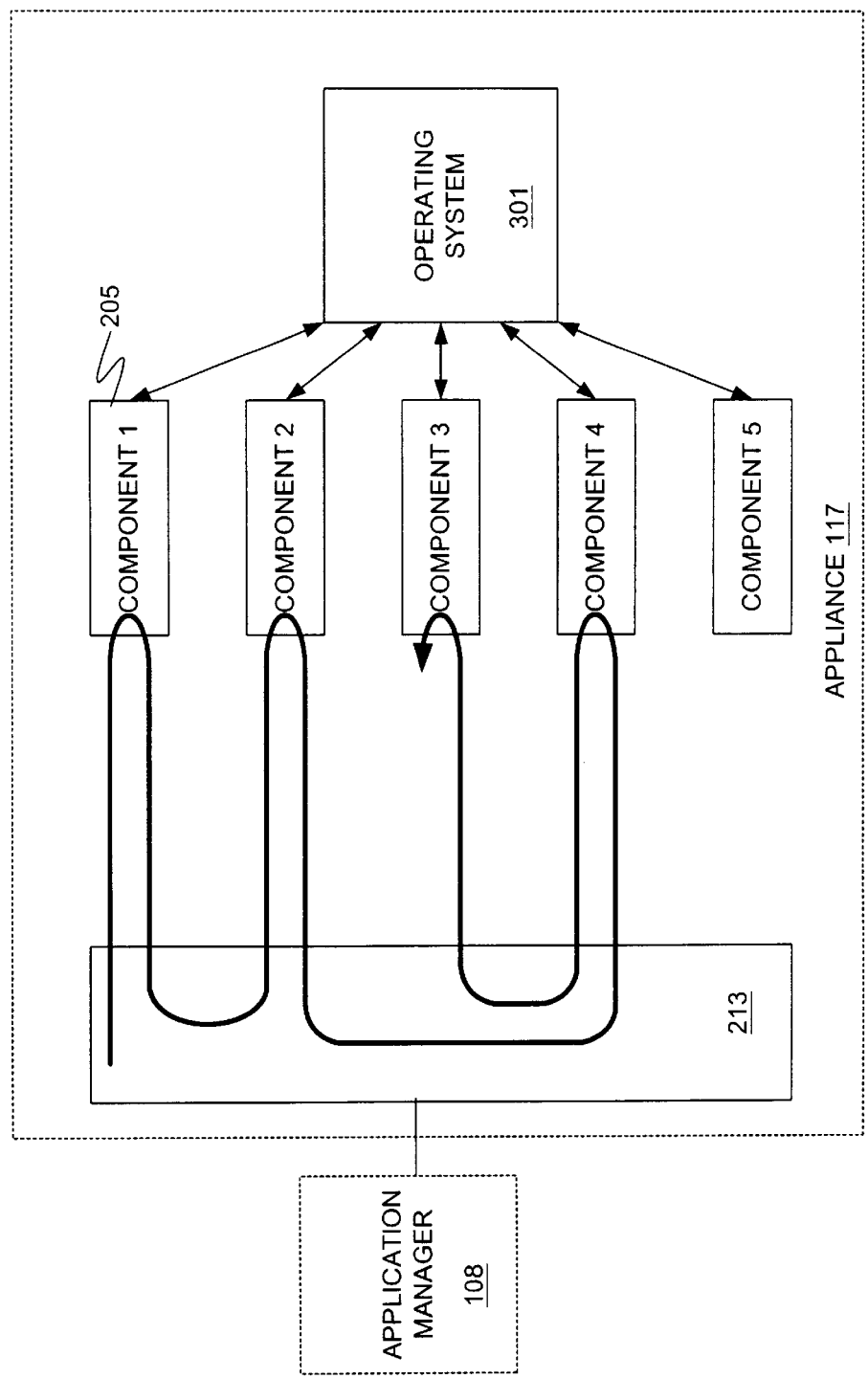
FIG. 4 illustrates a process flow during an application instance in accordance with an alternative embodiment of the present invention.

FIG. 3 and FIG. 4 illustrate two alternative implementations in which the present invention enables application services to be provided via cooperative action of appliance 117 and application management server 108. In FIG. 3 and FIG. 4, agent 202 has already completed tasks of updating components 205 (e.g., "component 1" through "component 5" in FIG. 3 and FIG. 4) so that valid copies are resident in appliance 117. In the implementation of FIG. 3, the application services are provided by executing script 213 on application management server 108. In the implementation of FIG. 4, application services are provided by executing a valid copy of script 213 on appliance 117. A relevant copy of script 213 is only resident on application manager 108 in either implementation.

Referring to FIG. 3, script 213 executing on application manager 108 includes program constructs that embody the application logic that controls the flow of control at a high level. Script 213 makes calls to the interfaces of selected components 205. Script 213 passes variables to each component 205 and maintains the variables returned from each component 205. This embodiment uses ASP services or the equivalent in a web server 211 to compile and execute a script 213.

In the example of FIG. 4, script 213 is compiled by application manager 108, but transferred to appliance 117 for execution on the computing resources of appliance 117. Alternatively, application manager 108 can simply retrieve and send script 213 to appliance 117 where it is compiled using, for example, scripting interface 203.

In each of the examples, components 205 execute on appliance 117 using the resources of operating system 301 as required. In this manner, components 205 implement the functionality of the application services. Because components 205 execute on the appliance 117, they have the same level of accessibility to operating system resources as conventional software applications. This is important for a variety of application services such as anti-virus software that must obtain intimate knowledge of appliance 117 which must be obtained from operating system 301.

FIG. 5 shows components of agent 202 in greater detail in functional block-diagram form. A primary function of agent 202 is to obtain updates of components 205 and script 213 as needed as implemented by an update component 501. Update component 501 monitors the validity of installed components 205. Upon determining that one or more components 205 have become invalid either due to expiration or otherwise, update component connects to an application management server 108 or other network appliance 117 that has the relevant valid components and negotiates an update.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method of providing application services to a plurality of network-coupled computing appliances, the method comprising:
    defining a set of desired application functions;
    identifying a set of code resident on a network-connected application management server that when executed in a network appliance provide the desired application functions;
    executing a first application management agent in a first of the plurality of network-coupled computing appliances;
    executing a second application management agent in a second of the plurality of network-coupled computing appliances;
    repetitively checking for updates of the identified code using the first application management agent;
    downloading updates of the identified set of code from the network-connected application management server into the first of the plurality of network-coupled computing appliances as the updates become available;
    downloading the updates of the identified set of code from the first network-coupled computing device into the second of the plurality of network-coupled computing appliances; and
    wherein the plurality of network-coupled computing appliances are organized as a subnet and the second of the plurality of network-coupled computing appliances generates a broadcast request within the subnet identifying a desired update and the first of the plurality of network-coupled computing appliances responds to the broadcast request with an indication that the first of the plurality of network-coupled computing appliances is in the process of downloading the identified desired update.

2. The method of claim 1 further comprising executing the identified code in the first and second network-computing appliances.

3. The method of claim 1 further comprising:
    causing the second network-coupled agent to identify the first network-coupled agent before downloading the updates of the identified code from the first network-coupled computing device into the second network-coupled computing appliance.

4. The method of claim 3 wherein the step of causing the second application management agent to identify comprises requesting the application management server to provide a valid network address for the first network-coupled computing appliance.

5. The method of claim 1 further comprising causing both the first and second application management agents to repetitively check for availability of updates of the identified code from the application management server.

6. The method of claim 1 wherein the second application management agent selectively determines whether to download the update from the first network-coupled appliance or from the application management server.

7. The method of claim 6 wherein the selection is based upon file size of the update.

8. The method of claim 6 wherein the selection is based upon relative quality of service between the first network-coupled computing appliance, the second network coupled computing appliance, and the application management server.

9. The method of claim 1 wherein the first and second network-coupled computing appliances belong to a common subnet and downloading the updates of the identified code from the first network-coupled computing appliance into the second network-coupled computing appliance further comprises:
    generating a subnet broadcast request for the update by the second network coupled computing appliance; and
    causing the first network coupled computing appliance to respond to the broadcast request.

10. The method of claim 1 further comprising:
    executing a third application management agent in a third of the network-coupled computing appliances; and
    downloading updates of the identified code from the second network-coupled computing appliance into the third network-coupled computing appliance.

11. The method of claim 10 further comprising:
    causing the third application management agent to generate a subnet broadcast to both the first and second network-coupled computing appliances to request the update; and
    causing the first and second network-coupled computing appliances to delay response to the broadcast request for different amounts of time.

12. The method of claim 11 wherein the different amounts of time are determined by a random time delay generator executing in the first and second network-coupled computing appliances.

13. A computer network providing software application code updates comprising:
    a plurality of nodes, each node comprising a computing device capable of executing application code;
    computer executable software devices programmed to cause each node to repetitively check for updates of the application code;
    a first node of the plurality of nodes that downloads an identified update from a source outside of the computer network;

a second node of the plurality of nodes that downloads the identified update from the first node; and wherein the plurality of nodes are organized as a subnet and the second node generates a broadcast request within the subnet identifying a desired update and the first node responds to the broadcast request with an indication that the first node is in the process of downloading the identified update.

14. The computer network of claim 13 further comprising a third node that downloads the identified update from the second node.

15. The computer network of claim 13 wherein the plurality of nodes are organized as a subnet and the second node generates a broadcast request within the subnet identifying a desired update and the first node responds to the broadcast request with an indication that the first node possesses the identified update.

16. The computer network of claim 13 wherein the second node generates an indication on a user interface of the second node indicating progress of the process of downloading occurring on the first node.

17. A method for obtaining digital information from a centralized resource in a network comprising a plurality of network-coupled computing appliances as comprising:

causing a first of the network-coupled computing appliances to issue a first broadcast request to other network-coupled computing appliances, wherein the first broadcast request identifies the digital information and requests a response from any of the other network-coupled computing appliances that possess the identified digital information;

upon failing to receive a response to the first broadcast request, causing the first of the network-coupled computing appliances to generate a second broadcast request to the other network-coupled computing appliances, wherein the second broadcast request identifies the digital information and requests a response from any of the other network-coupled computing appliances that are currently downloading the identified digital information.

18. The method of claim 17 further comprising generating a response to the first broadcast message in any one of the other network-coupled computing appliances wherein the response includes state information that indicates that the responding network-coupled computing appliance has completed download of the identified digital information.

19. The method of claim 18 wherein the first network-coupled appliance responds to the state information by initiating a download of the identified digital information from the responding network-coupled appliance.

20. The method of claim 17 further comprising generating a response to the second broadcast message in any one of the other network-coupled computing appliances wherein the response includes state information that indicates status of the ongoing downloading.

* * * * *